Figure 1:
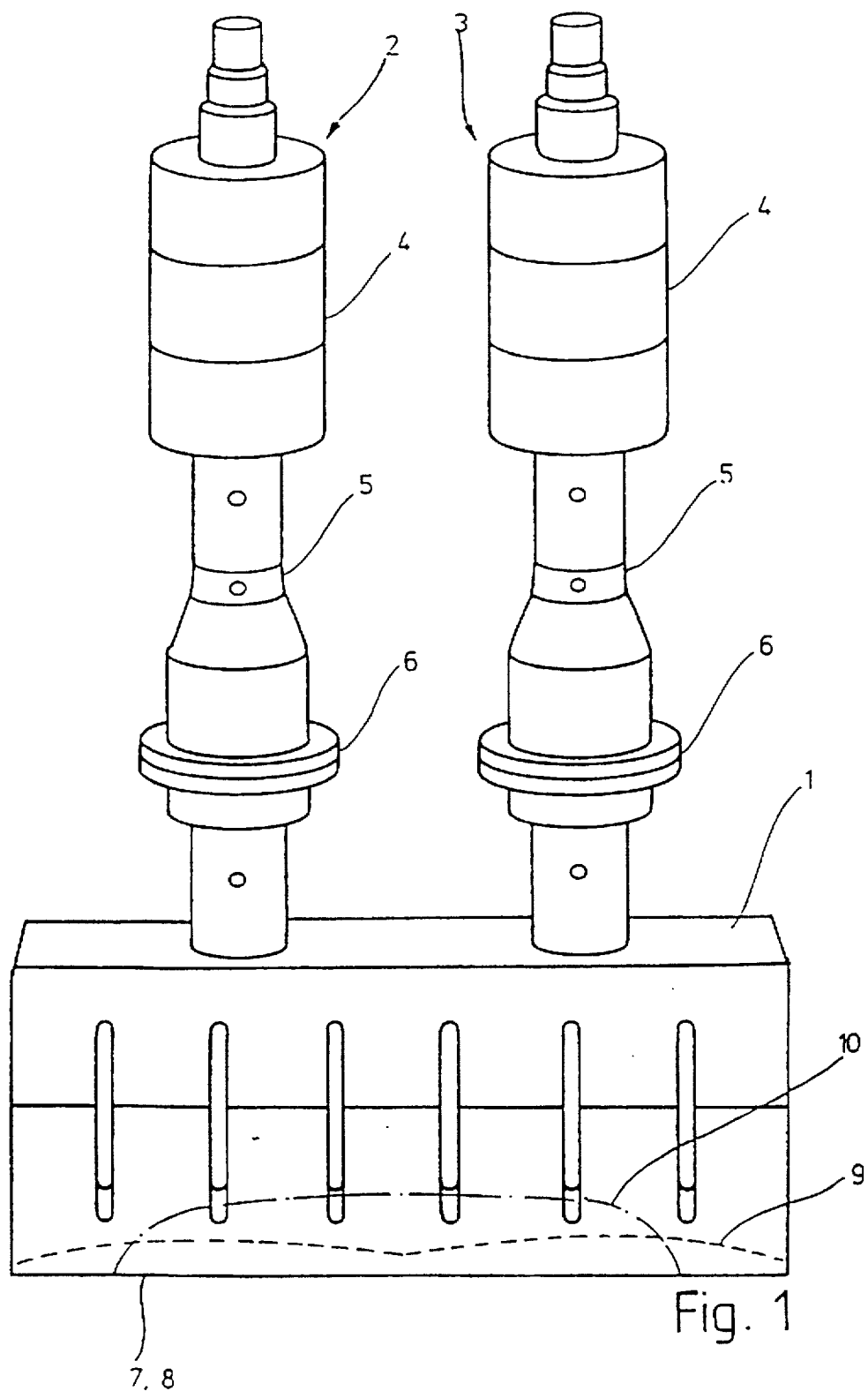

United States Patent [19]

Hermann

[11] Patent Number: 5,730,351
[45] Date of Patent: Mar. 24, 1998

[54] DEVICE FOR ULTRASOUND TREATMENT OF A WORKPLACE

[75] Inventor: Walter D. Hermann, Karlsbad-Ittersbach, Germany

[73] Assignee: Walter Hermann Ultra Schalltechnik GmbH, Karlsbad-Ittersbach, Germany

[21] Appl. No.: 553,980

[22] Filed: Nov. 6, 1995

[30] Foreign Application Priority Data

Nov. 8, 1994 [DE] Germany ............ 44 39 470.5

[51] Int. Cl.⁶ ............................................. B23K 20/10
[52] U.S. Cl. ........................................ 228/1.1; 156/580.1
[58] Field of Search ................... 228/1.1, 110.1; 451/165; 310/323; 156/73.1, 580.1

[56] References Cited

U.S. PATENT DOCUMENTS

| 2,723,386 | 11/1955 | Camp ............................ 451/165 |
| 3,166,840 | 1/1965 | Bancroft et al. ................ 228/110.1 |
| 3,209,448 | 10/1965 | Jones ............................ 228/110.1 |
| 4,466,565 | 8/1984 | Miyazima ....................... 228/1.1 |
| 4,549,684 | 10/1985 | Telly et al. ..................... 228/6.1 |
| 5,494,207 | 2/1996 | Asanasavest .................... 228/1.1 |
| 5,540,614 | 7/1996 | Poschl ........................... 451/165 |

FOREIGN PATENT DOCUMENTS

| 1590644 | 5/1970 | France ........................... 228/1.1 |
| 2095966 | 1/1972 | France ........................... 228/1.1 |
| 32 18 920 | of 1983 | Germany . |
| 33 42 619 | of 1983 | Germany . |
| 405121139 | 5/1983 | Japan ............................. 228/1.1 |
| 63-242479 | of 1988 | Japan . |
| 625429 | of 1981 | Switzerland . |
| 603566 | 4/1978 | U.S.S.R. ......................... 451/165 |
| 2 127 587 | of 1984 | United Kingdom . |

OTHER PUBLICATIONS

"Ultrasonic Welding of Thin Metal Plates Using a Complex Vibration Welding Tip" by Jiromaru Tsujino et al, Japanese Journal of Applied Physics, Proceedings 12th Symposium on Ultrasonic Electronics (1992) Suppl. 31–1.

*Primary Examiner*—Samuel M. Heinrich
*Attorney, Agent, or Firm*—Gary M. Nath; Nath & Associates

[57] ABSTRACT

A device for welding or cutting a workpiece via ultrasound. The device features a sonotrode and a drive unit for the sonotrode. The drive unit incorporates at least two ultrasonic oscillating units. Drive units of this type allow for vibrations to be set up in larger sonotrodes, and also allow for a more uniform amplitude distribution.

10 Claims, 3 Drawing Sheets

DEVICE FOR ULTRASOUND TREATMENT OF A WORKPLACE

The invention pertains to a device for ultrasound treatment of a workpiece, where the device features a sonotrode and a drive unit for the sonotrode.

Devices of this type, usually called ultrasonic welding systems, are known in numerous varieties. In this case the workpiece to be welded or to be processed is located between a sonotrode and an opposing tool. The drive unit causes the sonotrode to oscillate and the necessary welding energy is transferred when the sonotrode is pressed against the workpiece. As a rule, the drive unit consists of a piezoelectric converter and possibly an amplitude transformation unit located between the converter and the sonotrode. The piezoelectric converter produces high-frequency vibrations at a particular amplitude. This amplitude can be increased with the amplitude transformation unit, e.g. in a ratio of 1:2. This increased amplitude is applied to the sonotrode input and, as a rule, it is increased again in the sonotrode. If the sonotrode is resting against the workpiece, then the output amplitude generates a high frequency oscillation of the molecules of the material to be welded. Due to internal friction and interfacial friction, the material heats up to the softening point, so that it melts together with the likewise softened contacting structural element.

It turns out that with ultrasonic welding systems of this type, structural elements can be effectively welded together. In addition to the welding process, riveting and counterboring and also cutting or separating are known. However, in all cases the size of the structural element is limited by the size of the sonotrode. If the sonotrode exceeds a given size, then it will oscillate with the specified or desired amplitude only in a limited region, such that this region is located as a rule in the vicinity of the anchoring point of the piezoelectric converter and/or of the amplitude transformation unit. The other areas located outside this region also oscillate, of course, but at a clearly reduced amplitude. If a sonotrode of this type is placed on two structural components to be welded together, then they will indeed be reliably welded together in the region where the sonotrode oscillates at the specified or desired amplitude, but outside this region little or no welding takes place. If the amplitude is increased so that the outer region oscillates at the desired amplitude, then the amplitude of the inner region is so great that excessive welding and burn spots appear on the adjoining structural element. In general, one finds that large sonotrodes of this type are not suitable for welding purposes. Also, in practice, extremely large sonotrodes cannot even be excited.

With reference to this disadvantage, attempts were made to weld large structural elements with several sonotrodes simultaneously, wherein the disadvantage occurs that in the transition region from the one sonotrode to the other, surface deformations of the structural element occur. This is particularly undesirable in the case of high-quality structural elements or visible surfaces.

The invention is therefore based on the problem of refining a device of the type described above so that it can also be used for welding of large structural elements.

This problem is solved according to this invention in that the drive unit is formed from at least two ultrasound oscillating units.

The design configuration according to this invention thus calls for a single sonotrode that is not driven by a single drive unit, but rather features at least two ultrasound oscillating units that set up oscillations in the sonotrode. This design has the important advantage that the amplitude distribution in the sonotrode is much more homogeneous than for the known state of the art. Moreover, the sonotrode features an overall greater output amplitude. Furthermore, through the use of several ultrasound oscillating units, the performance can be expanded. Thus, relatively large structural elements can be readily welded together without problem, wherein the sonotrode contains ultrasound oscillating units so that the output amplitude of the sonotrode is essentially uniform. In this case, the ultrasound oscillating units can be of the same design, that is, they can have the same performance, but they can also have different performance, wherein the arrangement of the ultrasound oscillating units at the sonotrode is then selected accordingly.

In accordance with one preferred embodiment example, the ultrasound oscillating units are connected to a common ultrasound generator. This ensures that the ultrasound oscillating units will oscillate at the same frequency and the sonotrode will be excited uniformly.

In another embodiment of the invention, the individual ultrasound oscillating units are attached to several ultrasound generators, wherein the ultrasound generators oscillate uniformly according to a preset control frequency and in this manner uniformly excite the individual ultrasound oscillating units.

In one particularly preferred embodiment, the ultrasound oscillating units feature piezoelectric converters whose resonant frequency is essentially the same. Due to this measure, the individual ultrasound oscillating units operate at their optimum operating range and generate the maximum amplitude.

An additional application is opened up because the sonotrode features an irregular cross section. These sonotrodes generally have an irregular geometry and the ultrasound oscillating units can be placed on them in such a way that the output amplitude is the same across the entire surface area of the sonotrode or is limited to a very narrow band. In this manner, irregularly shaped or curved work pieces can also be processed.

In another embodiment of the invention, the sonotrode features a step at its welding tip or welding surface. With this type of sonotrode, structural elements can be processed or welded together, for example, when their processed surfaces are at different heights. The step can be steep in this case. However, steps are preferred that feature a gradual transition from the one plane to the other.

The ultrasound oscillating units are connected in parallel in one particularly preferred embodiment example. However, it is also possible to connect the ultrasound oscillation units in series, or to connect several ultrasound oscillating units in series.

One configuration provides that the ultrasound oscillating units feature piezoelectric oscillating modules that are located in a common converter housing. This will reduce the structural expense, and the individual ultrasound oscillating units can be arranged more densely.

An optimized or more uniform amplitude distribution at the output of the sonotrode is achieved in that the ultrasound oscillating units can be driven individually.

Figure 2:
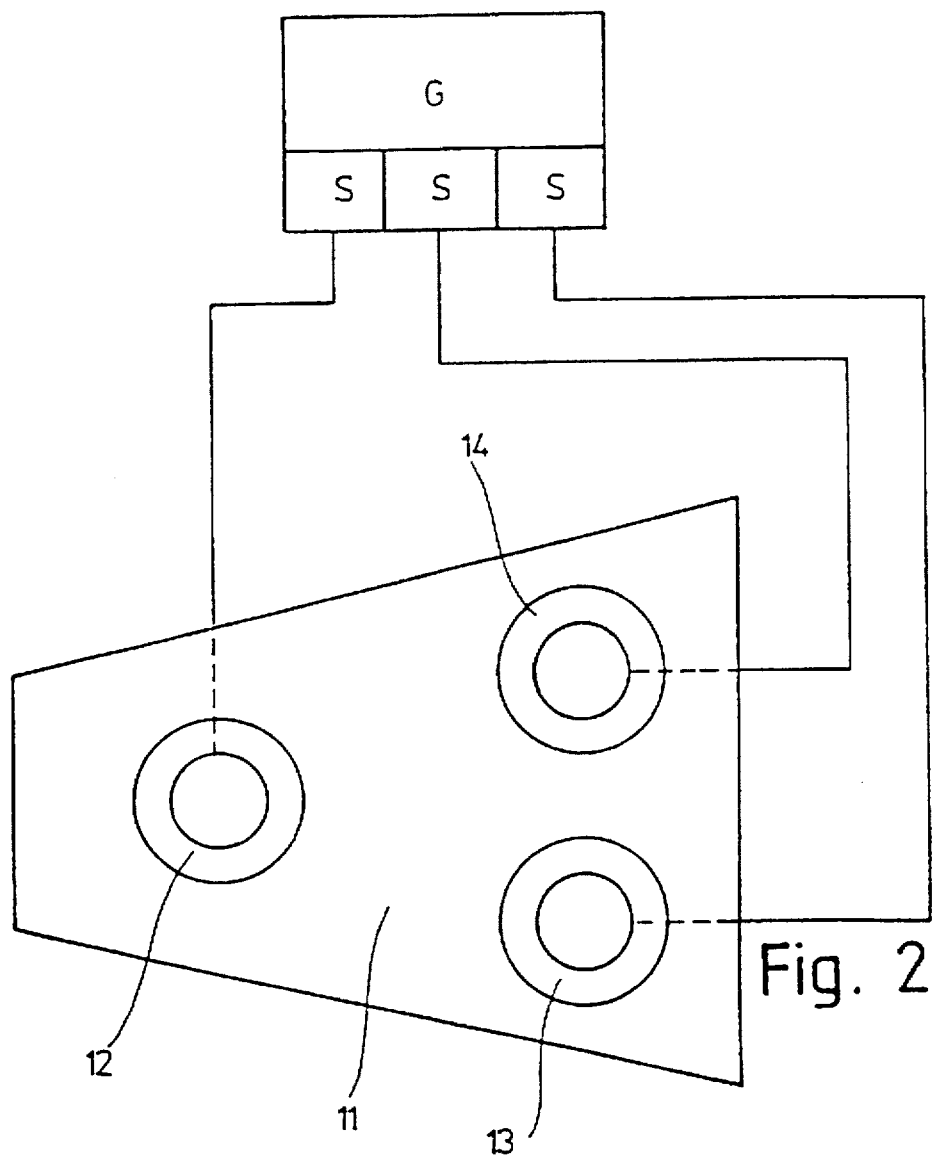
Figure 3:
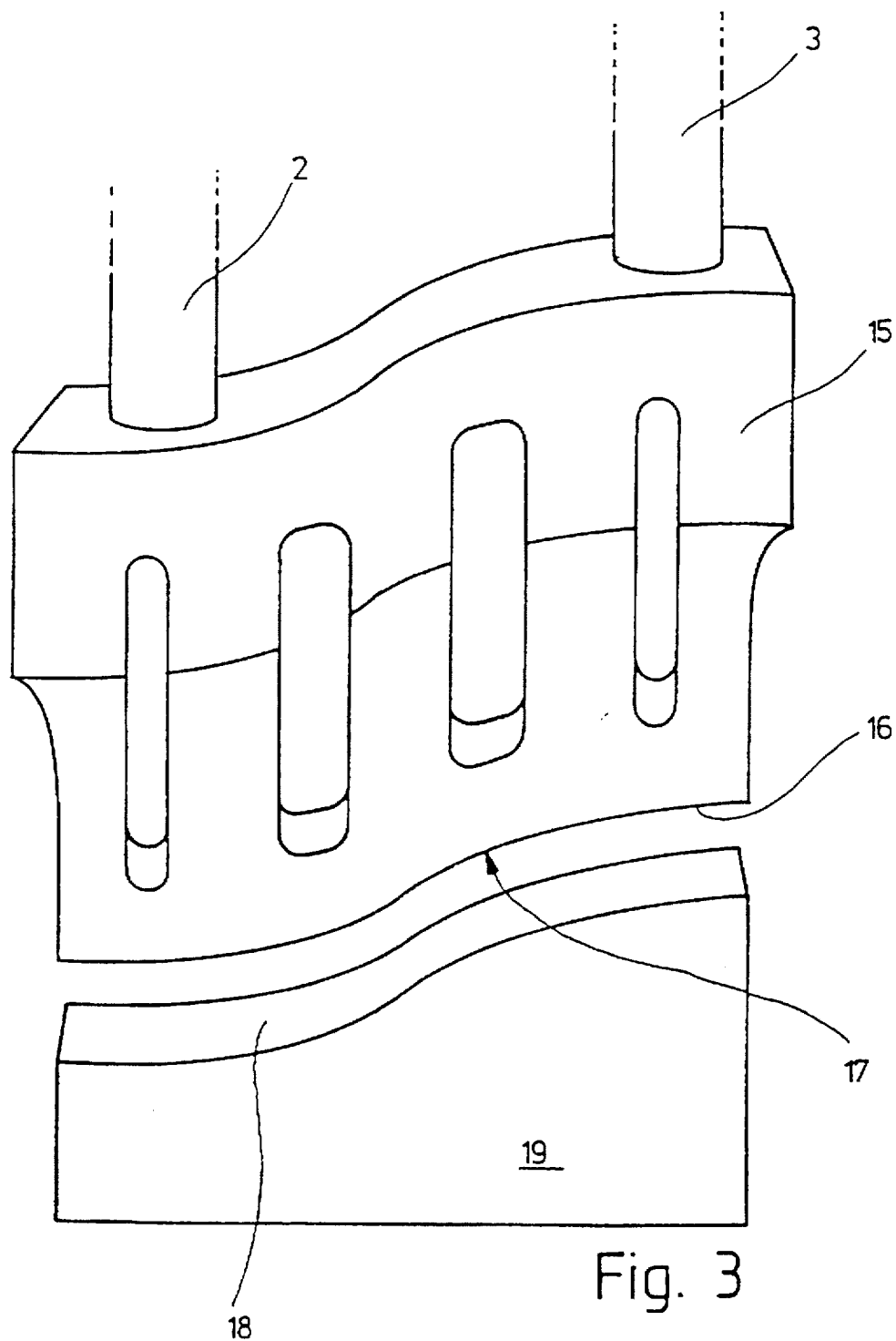

Additional advantages, properties and details of the invention will be described in detail below with respect to a particularly preferred embodiment example with reference to the figures. Shown are FIG. 1 A perspective view of a first embodiment of the invention, with a sonotrode and two drive units;

FIG. 2 A top view of a sonotrode in another embodiment of the invention with three drive units, and FIG. 3 A perspective view of an additional embodiment of a sonotrode with output located at different levels.

FIG. 1 presents an ultrasound welding system that features a very large sonotrode 1 to which two ultrasound oscillating units denoted by reference numerals 2 and 3 are attached. The two ultrasound oscillating units 2 and 3 form the drive unit for the sonotrode 1. Each ultrasound oscillating unit 2 or 3 features a piezoelectric converter 4, an amplitude transformation unit 5 attached to the output of the converter 4, and also a retaining ring 6 to which the two ultrasound oscillating units 2 and 3 are usually clamped. The two ultrasound oscillating units 2 and 3 are attached to the sonotrode 1 in such a way that at the output 7 of the sonotrode 1, that is, at the work surface 8, an essentially uniform amplitude distribution exists. This amplitude distribution is represented by a dashed line 9.

The welding unit shown in FIG. 1 has the significant advantage that at the output 7 of the sonotrode 1, as already mentioned, a significantly more uniform amplitude profile exists, and therefore the sonotrode 1 can be used across its entire length. In addition, the ultrasound oscillating units 2 and 3 can feature a lower operating power than a device with a single ultrasound oscillating unit. In a device of this type, this single ultrasound oscillating unit would be mounted in the middle of the upper side of the sonotrode 1 and the amplitude profile at the output 7 would run as is indicated by the dashed line 10. It is clearly evident that the profile of the line 9 is much more uniform across the length of the sonotrode 1 than is the profile of the line 10. With the device of the invention, consistent welds or riveting or counterboring is possible across the entire length, whereas in the state of the art little or no welding can be achieved in the outer regions and there exists the risk of excessive welding or burn spots in the central region.

FIG. 2 presents an additional configuration showing a top view where the sonotrode 11 has an irregular geometry, in this case, wedge-shaped. The drive unit of this sonotrode 11 consists in this embodiment example of three ultrasound oscillating units 12 to 14, which are only shown schematically. These ultrasound oscillating units 12 to 14 are connected to a common generator G, but can be driven by means of individual control units S. In this way it is possible to individually vary the power output from each ultrasound oscillating unit 12 to 14 and in this way a uniform amplitude distribution is provided at the output of the sonotrode.

FIG. 3 presents an additional sonotrode 15 whose working surface 16 is provided with a recess 17 so that the working surface 16 takes on a curved profile. With a sonotrode 15 of this type, curved structural elements 18 and 19 can be welded together. The sonotrode 15 illustrated in FIG. 3 contains two ultrasound oscillating units 2 and 3 in incomplete outline, but it can also be equipped with several ultrasound oscillating units.

Sonotrodes 15 with several drive units or ultrasound oscillating units 2 and 3 can feature the same height offset at the working surface as sonotrodes with one drive unit. In any case, they can be longer and/or wider than conventional sonotrodes. Under some circumstances even the height offset can be larger.

I claim:

1. A device for ultrasound treatment of a workpiece, said device comprising
   a sonotrode having a first side for contacting the workpiece and a second side; and
   a drive unit for said sonotrode, whereby the drive unit includes
   first and second ultrasound oscillating units, and
   first and second spaced apart connecting means for individually, respectively connecting said first and second oscillation units to said second side of said sonotrode.

2. The device of claim 1, wherein said first and second ultrasound oscillating units are excited by a common ultrasound generator.

3. The device of claim 1, wherein said ultrasound oscillating units include piezoelectric converters whose resonant frequency is the same.

4. The device of claim 3, wherein the sonotrode includes an irregular cross-section.

5. The device of claim 4, wherein the sonotrode includes a recess at its welding tip or surface.

6. The device of claim 5, wherein the sonotrode includes an irregular geometry.

7. The device of claim 6, wherein said first and second mounting means mount said first and second ultrasonic oscillating units in parallel to said sonotrode.

8. The device of claim 7, wherein the ultrasound oscillating units include piezoelectric oscillating modules located in a common converter housing.

9. The device of claim 8, wherein the ultrasound oscillating units can be individually controlled.

10. The device of claim 2, wherein said generator excites said first and second ultrasound oscillating units in the same direction and in the same phase.

* * * * *